UNITED STATES PATENT OFFICE.

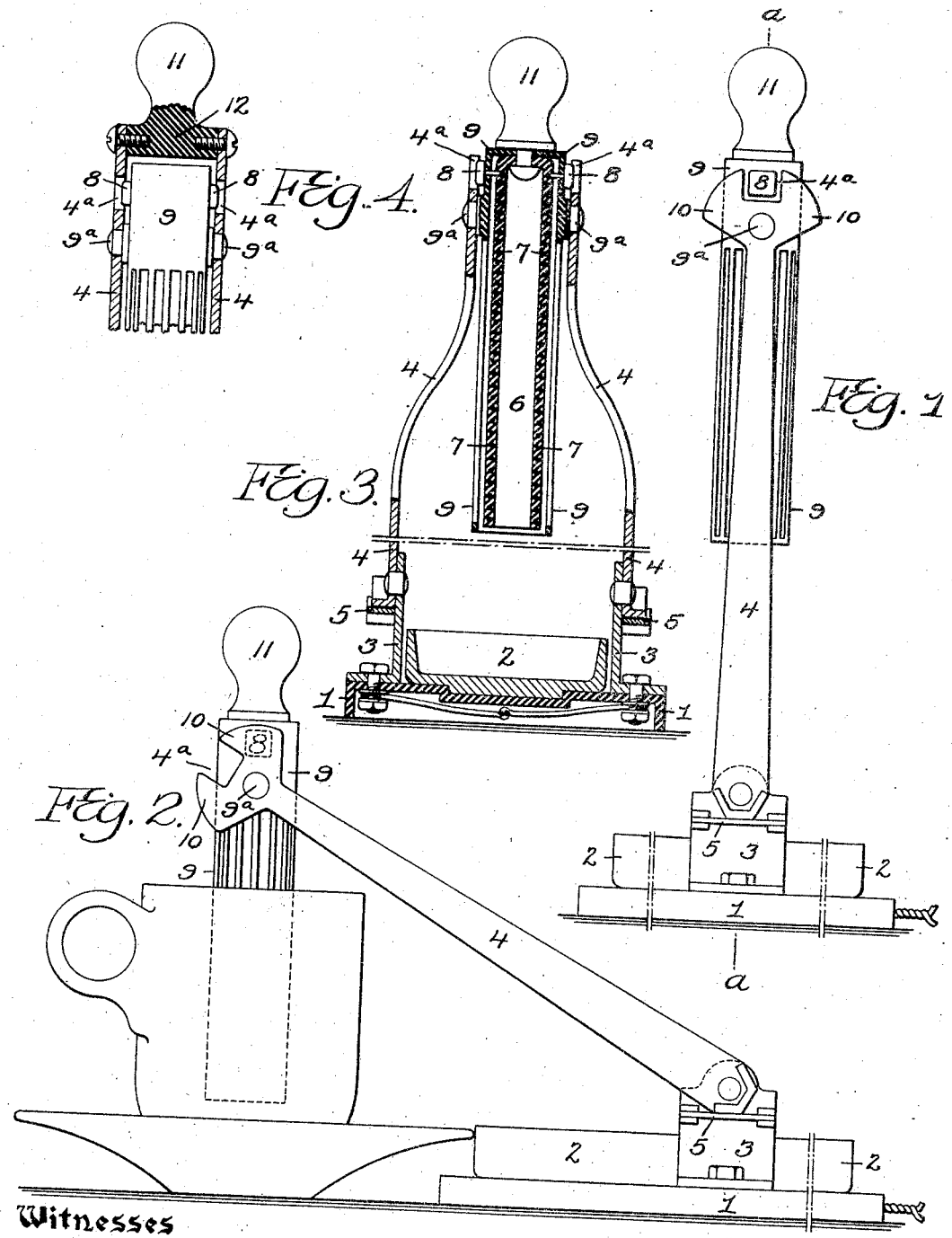

UTLEY WEDGE, OF ARDMORE, PENNSYLVANIA.

ELECTRICAL HEATER FOR LIQUIDS.

1,154,356.　　　　Specification of Letters Patent.　　Patented Sept. 21, 1915.

Application filed February 28, 1914.　Serial No. 821,677.

*To all whom it may concern:*

Be it known that I, UTLEY WEDGE, a citizen of the United States, residing in Ardmore, Pennsylvania, have invented certain Improvements in Electrical Heaters for Liquids, of which the following is a specification.

The object of my invention is to construct an electric heater for beverages, with especial reference to the use of the same for heating a cup of coffee or other beverage which has cooled from standing.

Features of my invention are means for introducing the heater into and removing it from the cup, means for automatically closing the circuit through the heater when the latter is introduced into the cup and opening said circuit when the heater is removed from the cup, means for preventing injury to the table cloth by contact of the heater therewith, means for preventing soiling of the table cloth by drip from the heater after it has been removed from the cup, and means for shielding the heater and preventing injury to the person by contact therewith.

In the accompanying drawings—Figure 1 is a side elevation of a heater for beverages constructed in accordance with my invention, the parts being shown in the position which they occupy when the heater is removed from the cup; Fig. 2 is a similar view showing the position assumed by the various parts when the heater has been introduced into the cup; Fig. 3 is a view, partly in elevation and partly in transverse section, on the line *a—a*, Fig. 1, and Fig. 4 is a view illustrating a modified embodiment of my invention.

In the drawing, 1 represents a hollow base of any suitable insulating material upon which rests a drip cup 2 at each side of which is a vertical standard 3, one of these standards being connected to one pole and the other to the opposite pole of the electric generator, as shown in Fig. 3.

Pivotally mounted upon each of the standards 3 is an arm 4 whose lower end presents faces at different angles, one or other of these faces being adapted to contact with a spring plate 5 mounted on the standard 3 so that said spring plate will serve to retain the arm 4 either in the vertical position shown in Fig. 1 or in a position inclined to the right or left from the vertical, as shown in Fig. 2.

The upper ends of the arms 4 converge and have pivotally mounted between them the electric heater which depends from said pivots and is of such weight as to normally maintain a vertical position irrespective of the angular position of the arms.

The heater may be constructed in any ordinary manner, that which I have shown in the present instance consisting of a tubular shell or casing 6 of material which is a good conductor of heat but a non-conductor of electricity, this shell or casing having embedded in or otherwise contacting therewith a coil 7, the opposite ends of the wire constituting said coil terminating in studs 8 on the outside of a shell 9 which surrounds the shell 6, and carries the pivot studs 9ª of the heater, said shell 9 being composed of material which is a good non-conductor both of electricity and heat, and serving to shield the heater and prevent injury to the person by contact therewith.

The shell 9 has slots or other openings formed in it so as to permit the liquid which is being heated to circulate freely through it. The studs 8, when the parts are in the position shown in Fig. 1, occupy notched or recessed portions 4ª of the arms 4 and are therefore free from contact with said arms.

The arms 4 are in electrical contact with the standards 3, consequently the upper end of one arm constitutes the terminal of one pole of the generator and the upper end of the other arm constitutes the terminal of the other pole, and when the parts are in the position shown in Fig. 1 the flow of current through the coil 7 is cut off. Each arm 4 has, however, on each side of its notch 4ª a wing 10, and when the arms are swung in one direction or the other so as to lower the heater into the cup, as shown in Fig. 2, the studs 8 are brought into contact with one or other of these arms 10 and the flow of current through the heating coil 7 is established, the heating of the coil being thus effected only when the heater is introduced into the cup, and at other times being cut off so as to prevent waste of current when the heater is not in use.

When the heater is out of operative position, as shown in Figs. 1 and 3, it occupies a position above the cup 2 which therefore receives the drip from the heater and prevents soiling of the table cloth, and the heater is so mounted that accidental contact of the same with the table cloth is impossible, hence soiling of the cloth or scorching or burning of the same by contact with the heater when the latter is not in use are impossible.

The swinging member of the device has an operative handle 11, whereby it can be readily moved from the position shown in Fig. 1 to that shown in Fig. 2, or back again, and this handle may be mounted either upon the heater member, as shown in Figs. 1, 2 and 3, or may be secured to or form part of an insulating bridge 12 which connects the upper ends of the arms 4 of the swinging member, as shown in Fig. 4, the heater in this case swinging freely between said arms so as to always assume by gravity the vertical position desired.

I claim:

1. The combination, in an electric heater for beverages, of the heating element, a swinging support upon which said heating element is pivotally mounted, and a pivotal mounting for said support whereby the heating element, while maintaining a vertical position, can be swung into and out of a cup containing the beverage to be heated.

2. The combination, in an electric heater for beverages, of the heating element, a swinging support upon which said heating element is pivotally mounted, a pivotal mounting for said support which permits the heating element to be swung into or out of the cup containing the beverage to be heated, and means whereby the swinging movement of the support is caused to open and close the circuit through the heating element.

3. The combination, in an electric heater for beverages, of the heating element, and a support therefor comprising a base, a carrying element pivoted at its lower end to said base and at its upper end to the heating element, whereby said heating element can always maintain a vertical position irrespective of the swinging movement of the carrier upon its pivot, said carrier being of greater length than the heating element, whereby, when the carrier occupies a vertical position, said heating element will be supported free from contact with the base.

4. The combination, in an electric heater for beverages, of a heating element, arms from which said heating element is pivotally suspended so as to hang vertically, a base having standards upon which said arms are pivotally mounted, and yielding means for retaining said arms either in the vertical position or in a position inclined in respect to the vertical.

5. The combination, in an electric heater for beverages, of the heating element, arms upon which said heating element is pivotally mounted so as to hang in a vertical position, a base having standards upon which said arms are pivotally mounted, and a cup seated on said base and serving to receive the drip from the heater when the latter is not in action.

6. The combination, in an electric heater for beverages, of swinging arms, one carrying the terminal of one pole and the other the terminal of the other pole of the electric generator, a heating element pivotally mounted upon said swinging arms, and studs constituting the terminals of said heating element, said studs being normally free from the terminals of the arms but being brought into contact therewith by the swinging of the arms.

In testimony whereof, I have signed my name to this specification, in the presence of two subscribing witnesses.

UTLEY WEDGE.

Witnesses:
KATE A. BEADLE,
HAMILTON D. TURNER.